(12) United States Patent
Auger et al.

(10) Patent No.: US 9,396,327 B2
(45) Date of Patent: Jul. 19, 2016

(54) SYSTEMS AND METHODS FOR SECURITY VERIFICATION IN ELECTRONIC LEARNING SYSTEMS AND OTHER SYSTEMS

(75) Inventors: Jeremy Jason Auger, Breslau (CA); Brian John Cepuran, Oakville (CA)

(73) Assignee: D2L Corporation, Kitchener, Ontario (CA)

( * ) Notice: Subject to any disclaimer, the term of this patent is extended or adjusted under 35 U.S.C. 154(b) by 3 days.

(21) Appl. No.: 13/108,399

(22) Filed: May 16, 2011

(65) Prior Publication Data

US 2012/0297454 A1 Nov. 22, 2012

(51) Int. Cl.
*G06F 21/00* (2013.01)
*G06F 21/54* (2013.01)
*H04L 29/06* (2006.01)
*G06F 21/62* (2013.01)

(52) U.S. Cl.
CPC ............ *G06F 21/54* (2013.01); *G06F 21/62* (2013.01); *H04L 63/101* (2013.01); *H04L 63/105* (2013.01); *G06F 2221/2113* (2013.01); *G06F 2221/2141* (2013.01); *H04L 63/107* (2013.01); *H04L 63/108* (2013.01)

(58) Field of Classification Search
CPC .............. G06F 2221/2113; G06F 2221/2141
USPC ................ 726/1–7, 26–30; 713/182–186; 709/217–229
See application file for complete search history.

(56) References Cited

U.S. PATENT DOCUMENTS

| | | | | |
|---|---|---|---|---|
| 6,161,139 A | * | 12/2000 | Win ................... | G06F 21/604 709/223 |
| 6,609,198 B1 | * | 8/2003 | Wood et al. ................... | 713/155 |
| 7,124,192 B2 | * | 10/2006 | High et al. ..................... | 709/229 |
| 7,287,271 B1 | * | 10/2007 | Riggins ............................. | 726/3 |
| 8,108,672 B1 | * | 1/2012 | Herbach et al. ............... | 713/168 |
| 8,122,500 B2 | * | 2/2012 | Dawson et al. ................. | 726/22 |
| 8,214,446 B1 | * | 7/2012 | Siegel et al. .................. | 709/207 |
| 8,621,561 B2 | * | 12/2013 | Cross et al. ....................... | 726/2 |
| 2002/0077985 A1 | * | 6/2002 | Kobata .................... | G06F 21/10 705/51 |
| 2004/0054923 A1 | * | 3/2004 | Seago et al. .................. | 713/201 |
| 2005/0097354 A1 | * | 5/2005 | Zurko et al. .................. | 713/200 |
| 2008/0162323 A1 | * | 7/2008 | Menear et al. .................. | 705/35 |
| 2010/0281173 A1 | * | 11/2010 | Vutukuri et al. .............. | 709/228 |

* cited by examiner

*Primary Examiner* — Madhuri Herzog
(74) *Attorney, Agent, or Firm* — Bereskin & Parr LLP/S.E.N.C.R.L., s.r.l.

(57) ABSTRACT

The embodiments described herein relate to security verification systems and methods. In some aspects, there is provided a security verification server comprising a server processor. The server processor is adapted to provide at least one account identifier, receive at least one command for execution, determine whether to activate one or more available additional permission sets to execute the received command, and if it is determined that one or more additional permission sets should be activated to execute the received command, activate those permission sets by executing the security verification processes associated therewith.

28 Claims, 4 Drawing Sheets

SYSTEMS AND METHODS FOR SECURITY VERIFICATION IN ELECTRONIC LEARNING SYSTEMS AND OTHER SYSTEMS

TECHNICAL FIELD

The embodiments herein relate to systems and method for security verification, particularly for network systems that may include electronic learning systems.

INTRODUCTION

Distributed software systems are widely used by many organizations for many purposes. For example, electronic learning (eLearning) systems may facilitate education over a large geographical area using communications networks, such as the Internet. Students, instructors, and administrators may collaborate and learn in virtual classrooms despite being located in different geographical locations. Furthermore, many traditional "brick-and-mortar" educational institutions are providing eLearning systems to complement and enhance more conventional classroom-based learning.

Generally, participants or users of eLearning systems will access the system remotely through a web-browser or other dedicated application. To facilitate such access, eLearning systems may employ a client-server architecture wherein one or more servers receive commands and requests from one or more client computers over a network (e.g. the Internet, a WLAN, etc.) and respond to such commands and requests in an appropriate manner.

Traditionally, to authenticate users who are connecting to the server, a user account and an associated password may be created for each user. The user is able to "login" to the system by providing account identification information (e.g. a username and password). Permissions are normally assigned to each user based on the user account and the user's role (e.g. student, instructor, administrator etc.).

However, there are security risks associated with such approaches. For example, it is possible for a client computer or a user account to be compromised. In particular, an unauthorized person may gain access to a user's username and password and use that user's account to access the system pretending to be the user. In many cases, the user may not even realize that the user account or client computer have been compromised. The unauthorized user may then take one of more actions that are undesired, such as deleting data, viewing private information, and so on.

SUMMARY OF SOME EMBODIMENTS

According to some aspects, there is provided a security method that includes providing at least one account identifier, receiving at least one command for execution, each command having command-specific requirements comprising zero or more of the permission sets that need to be activated before the command is executed, determining whether to activate one or more available additional permission sets to execute the received command (in some cases based on some context information), and if it is determined that one or more additional permission sets should be activated to execute the received command, then activating those permission sets by executing the security verification processes associated therewith.

The at least one account identifier is associated with zero or more permission sets available for activation, each permission set comprising permissions to execute one or more commands when that permission set is activated. Each permission set has a security verification process associated therewith to activate that permission set.

According to another aspect, there is provided a security verification system including at least one client computer having a client processor (the client processor adapted to send at least one command for execution), and at least one server having a server processor in data communication with the at least one client computer. The server processor is adapted to provide at least one account identifier, receive at least one command for execution from the at least one client computer (each command having command-specific requirements comprising zero or more permission sets that need to be activated before the command is executed), determine whether to activate one or more available additional permission sets to execute the received command, and if it is determined that one or more additional permission sets should be activated to execute the received command, activate those permission sets by executing the security verification processes associated therewith.

According to yet another aspect, there is provided security verification server comprising a server processor adapted to provide at least one account identifier, the at least one account identifier being associated with zero or more permission sets available for activation, receive at least one command for execution, each command having command-specific requirements comprising zero or more permission sets that need to be activated before the command is executed, determine whether to activate one or more available additional permission sets to execute the received command and if it is determined that one or more additional permission sets should be activated to execute the received command, activate those permission sets by executing the security verification processes associated therewith.

BRIEF DESCRIPTION OF THE DRAWINGS

The drawings included herewith are for illustrating various examples of systems, methods and apparatus of the present specification and are not intended to limit the scope of what is taught in any way. In the drawings.

DETAILED DESCRIPTION

Figure 1:
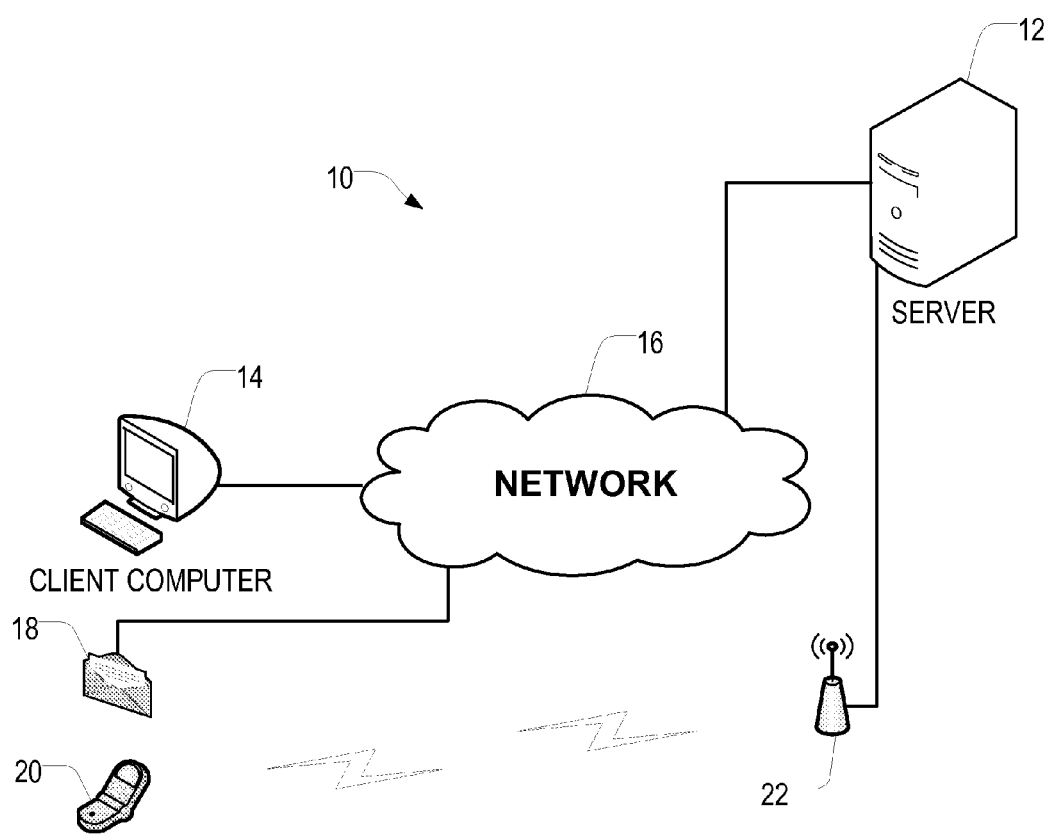
FIG. 1 is a schematic diagram of a security verification system according to some embodiments.

For simplicity and clarity of illustration, where considered appropriate, reference numerals may be repeated among the figures to indicate corresponding or analogous elements or steps. In addition, numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments generally described herein.

Furthermore, this description is not to be considered as limiting the scope of the embodiments described herein in any way, but rather as merely describing the implementation of various embodiments as described.

In some cases, the embodiments of the systems and methods described herein may be implemented in hardware or software, or some combination of both hardware and software. In some cases, these embodiments may be implemented in computer programs executing on programmable computing devices, each comprising at least one processor, a data storage device (including volatile and non-volatile memory and/or storage elements), at least one input device, and at least one output device.

In some cases, each program may be implemented in a high level procedural or object oriented programming and/or scripting language to communicate with a computer system. However, in other cases the programs can be implemented in assembly or machine language, if desired. In some cases, the language may be a compiled or interpreted language.

The systems and methods as described herein may also be considered to be implemented as a non-transitory computer-readable storage medium, configured with a computer program, wherein the storage medium so configured causes a computer to operate in a specific and particular manner to perform at least some of the functions described herein.

In a web-based eLearning system, many client computers may have one or more Internet browsers to facilitate access to online content. The Internet browsers could include Internet Explorer, Firefox, Safari, Chrome, and so on. In some cases, applications other than internet browsers may be used to access online content.

However, in some cases, security of the Internet browsers and/or client systems may be compromised. For example, it may be possible that unauthorized applications (e.g. Trojans, spyware, viruses, malware) are or become resident on the client computer without the user's knowledge, or at least without the user fully appreciating what the unauthorized applications are programmed to do.

Such applications may cause the client computer to function in an unpredictable or malicious manner. For example, the unauthorized software may gather personal information or cause the client computer to send unauthorized commands to a server hosting the eLearning system for execution.

As noted above, server-client web systems may provide a username/password combination to grant a user access to the system. In some cases, the username/password combination may have been compromised or "hacked" by an unauthorized user. For example, a password associated with a particular user account may be obtained by an unauthorized application (e.g. by a malware application that performs keystroke logging), via a brute force attack, or through various other techniques. In such cases, an unauthorized entity (e.g. a human person or a software application) may gain unauthorized access to an eLearning server, leaving the server vulnerable to security breaches.

In some embodiments, a compromised client computer may obtain information about the user without the user's knowledge. For example, an unauthorized software application resident on the client computer may "hijack" a browser application and then intercept and record private or personal information associated with the user (e.g. financial information, user account information, and so on). The intercepted information may then be used in an unauthorized manner. Moreover, the user of the client computer may be initially unaware that the client computer is gathering personal information and making unauthorized access, and as such, the unauthorized actions may continue for an extended period of time before the user becomes aware and can taken actions to stop the unauthorized access.

In many cases, to mitigate the potential fallout in cases when a user account or a client computer is compromised, some users will use multiple accounts, each account having access to different data or different functional aspects within the system. For example, the user may have a "regular" account that has very limited permissions and a separate "administrator" or "super-user" account that has broad access to make changes to the system, delete vast amounts of data, and so on. Using multiple separate accounts may be advantageous in a sense that any security breach of a single account may be limited to certain areas of the system (e.g. only those areas authorized by the particular compromised account). Furthermore, having multiple accounts with different levels of access may also allow the user to avoid using the "administrator" account (with a high level of access) in situations where a low level of access is sufficient. This may lead to less-frequent use of the administrator account, which can reduce the likelihood of that account being compromised.

However, having multiple accounts may also be disadvantageous. For example, it may be undesirable to require the user and the system to maintain multiple accounts. For example, the user may have to remember multiple login credentials (including multiple usernames, each with a corresponding password). In addition, there is still a risk that multiple accounts (including administrator accounts) may be compromised (particularly if the same or similar password and/or username information is used across multiple accounts). Finally, having multiple accounts may not fully prevent the client computer from performing malicious activity in the background without the user's knowledge. For instance, a user may be logged in to their administrator account (with a higher level of access) while certain malicious activities are ongoing.

Referring now to FIG. 1, illustrated therein is a security verification system 10 according to some embodiments. As shown the security system 10 comprises a server 12 and at least one client computer 14 connected to the server 12 over a network 16. The network 16 may be the Internet, or another form of a wide area network (WAN), a local area network (LAN), or generally any other suitable communications network.

In some embodiments, the system 10 may implement an eLearning system for facilitating an educational course. In other embodiments, the system 10 may be used with other network systems, such as banking systems, military systems, and so on.

In some embodiments, to facilitate an eLearning course for an eLearning system, the server 12 may store various information or data associated with the course, such as lecture materials, online testing information, student records, submitted assignments, and so on.

In various embodiments, the client computer 14 may include a desktop computer, laptop or notebook, a tablet or slate computer, a mobile electronic device (e.g. "smart phone") or another suitable type of computing device that can access the network and issue commands and/or requests to the server 12. The number and the type of client computers 14 may vary in various embodiments, and in some cases may include hundreds or even thousands of client computers 14.

A user (e.g. a student, instructor, administrator) may use the client computer 14 to access the data associated with the eLearning course. For example, an administrator may use the client computer 14 to access the server 12 to add, remove, modify or otherwise perform administrative tasks on the data associated with the eLearning course. A student may use the client computer 14 to access the server 12 to read lecture materials, submit assignments, look up grades, participate in discussion forums and so on. An instructor may use the client computer 14 to publish lectures, mark received assignments or tests, assign grades, and so on.

As such, different users of the system may require different types of access to different sets of data depending on their particular contribution and participation in the eLearning class.

The client computer 14 usually includes a client processor, a client data storage device, a display, and at least one client data communication device operable to connect to the Internet or another communications network. For example, the data communication device may be an Ethernet network modem, a wireless network modem compatible with an IEEE 802.11 ("WI-FI") standard and/or a cellular data network modem (e.g. EDGE, 3G, 4G and so on).

The client computer 14 may also include one or more Internet browser applications for communicating with the server 12 over the network 16 (e.g., the Internet). In other embodiments, applications other than Internet browsers may be used to communicate with the server 12. For example, dedicated application or "app" may be used to communicate with the server 12.

Figure 2:
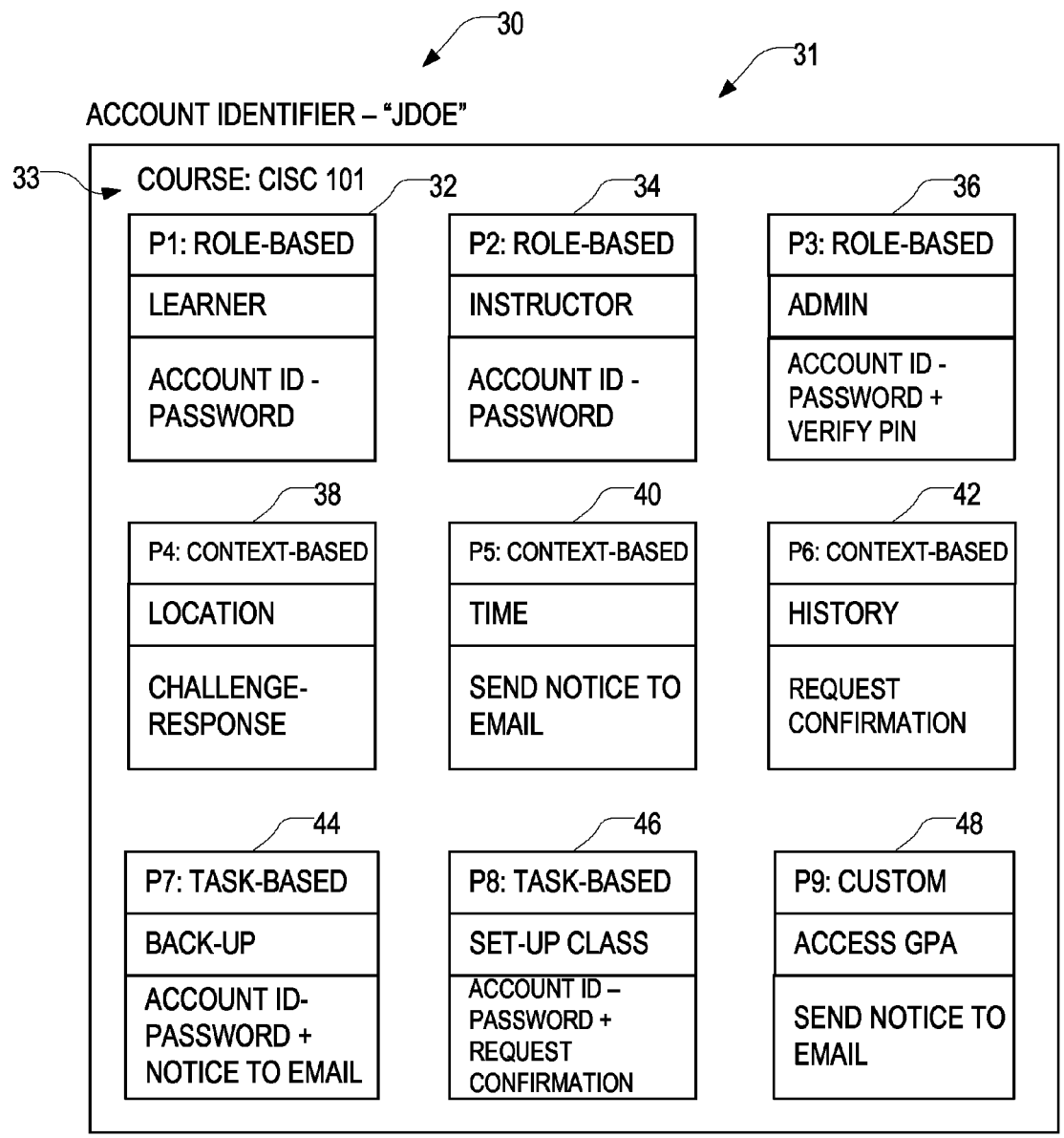
FIG. 2 is a block diagram illustrating exemplary permission sets associated with a exemplary account identifier for an exemplary eLearning class used by the server shown in FIG. 1.

Referring now to FIG. 2, illustrated therein is an exemplary account identifier 30. The account identifier 30 is generally associated with a user account that is assigned to one or more users of the system 10 who has access to the server 12. For example, a user account may be created for each user that accesses data for the eLearning course on the server 12. That is to say, each student, instructor, and administrator may have an associated user account and an account identifier associated therewith.

The account identifier 30 may include a "user name" comprising alphanumeric characters. The account identifier 30 may also have an associated password. The client computer 14 may provide the account identifier 30 to the server 12 to identify a current user of the client computer 14.

Generally, the account identifier is associated with a single user of the system 10. In some embodiments, one or more generic account identifiers (e.g. a guest account) may be assigned to unknown users (or users that have not identified themselves to the system) who desire access to the system.

Generic accounts will normally have limited permission/access associated therewith. For example, a guest account identifier may be assigned by default and the guest account identifier may be permitted to view certain public web pages of a given website, but not access other private information (e.g. course grade information). In some cases, no account identifier may be necessary to access certain information from the server 12 (e.g. a basic level of read-only access may be provided without any account identifier).

In other cases, a specific account and associated account identifier may be created and used by another system to perform a particular function. For example, an account having a specific account identifier may be created in the server 12 for backing-up data associated with the eLearning class. In particular, a back-up system may use that account identifier to authenticate itself to the server 12 to perform a backup thereof.

Traditionally, once a client computer 14 successfully authenticates itself, for example by providing a correct combination of account identifier and password information, the client computer 14 is granted a level of access associated with that account identifier. For example, an administrator of the server 12 may log-in from a client computer 14 using an account identifier which has administrator-level permissions to execute various commands, and once a successful authentication is received that client computer 14 is trusted for a period of time. However, such trust may be misplaced as the client computer 14 or the account may have been compromised by an unauthorized user or by malicious software applications.

In contrast, generally using the teachings herein, security verification in the system 10 may be performed based on the specific commands that are being executed, instead of only the account identifier 30 that is being provided by the client computer 14. Moreover, in some embodiments security verification may be customizable and based on various factors including an operational-context of the system, as described below. Furthermore, the type(s) of desired security authentication procedures may also be customizable, for example depending on a particular context. This may be useful to help strike a balance between convenience and security.

As shown in FIG. 2, the account identifier 30 has a number of available permission sets P1-P8, generally indicated by reference numeral 31, that are associated with the eLearning course 33 (in this embodiment labeled course "CISC 101"). In other embodiments, the account identifier 30 may have permission sets associated with other courses (not shown).

It should be understood that associating the account identifier 30 with the course 33 and the permission sets 31 (i.e. account identifier-by-account identifier basis) is an exemplary way of organizing the account identifier 30, course 33, and permission sets 31. In other embodiments, the account identifiers, courses, and permission sets may be organized in a different manner. For example, the account identifiers, courses, and permissions may be organized on a course-by-course basis such that each course is associated with multiple account identifiers and permission sets, and so on.

Each of the permission sets 31 comprises permissions to execute one or more commands (for example, the commands shown in FIG. 3 and described below) when that permission set is activated. Generally, each of the permission sets 31 (when activated) grants permission to execute selected commands to particular records/data on the server 12. For instance, in some embodiments, the permission sets 31 may grant access to selected databases, or selected data tables or views of the databases coupled to the server 12.

Each of the permission sets 31 also has a security verification process associated therewith to activate that permission set. In particular, to activate a specific permission set, the corresponding verification process should be executed. As will be discussed further below, the security verification process may involve different actions undertaken by the server 12, the client computer 14, or both the server 12 and the client computer 14 to provide a security check.

Figure 3:
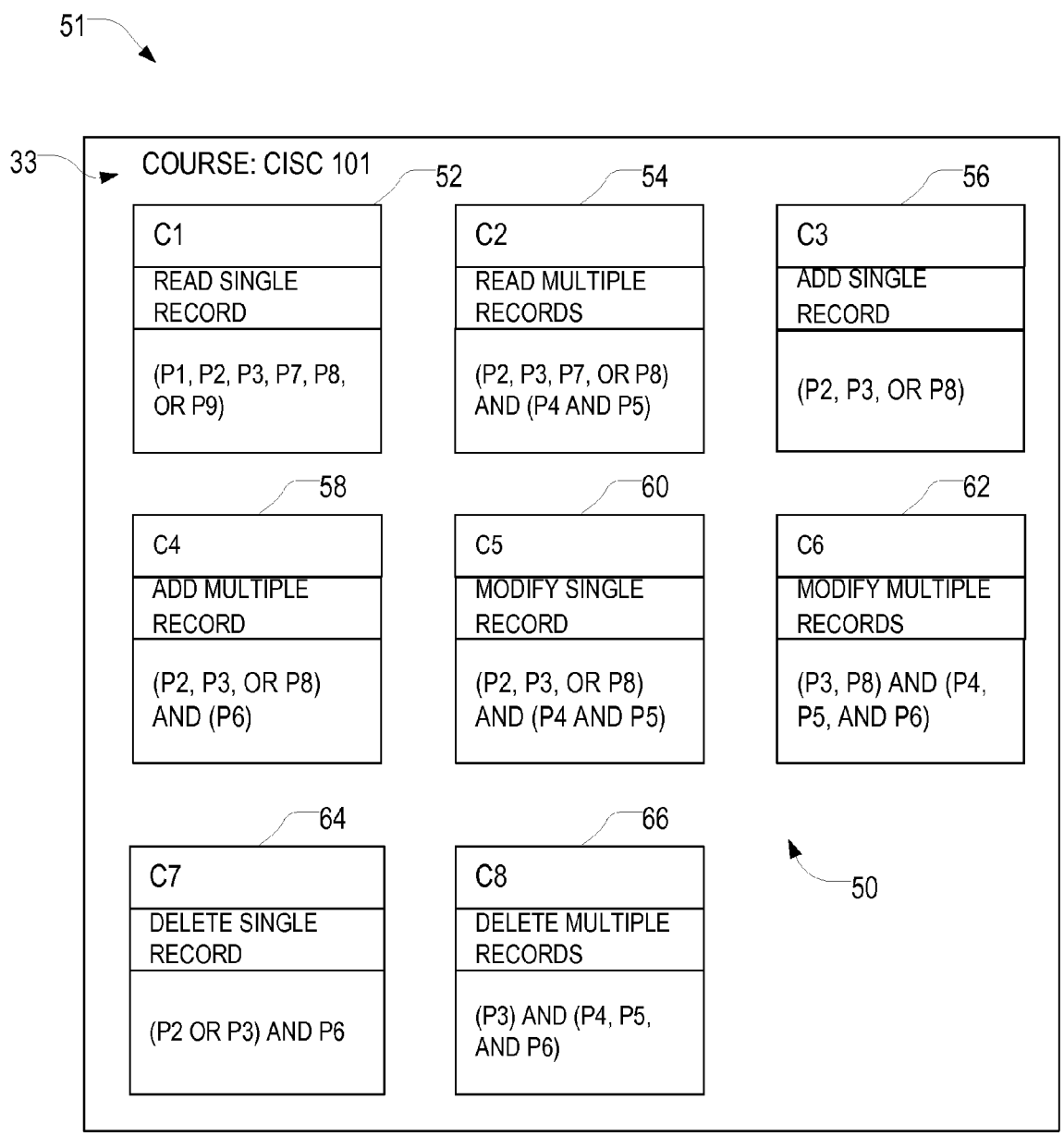
FIG. 3 is a block diagram illustrating exemplary commands and command-specific requirements for the eLearning class used by the server shown in FIG. 1.

Referring now to FIG. 3, illustrated therein is a command table associated with the eLearning course 33. The command table 51 includes exemplary commands 50 associated with the eLearning course 33 "CISC 101" that may be received at the server 12. Continuing with the eLearning example, the commands 50 may be directed to accessing records of the course 33, for example.

Each of the commands 50 has command-specific requirements associated therewith. The command-specific requirements may include zero or more of the permission sets 31 that should to be activated before the command is executed. That is, when a client computer 14 submits a command to be executed to the server 12, the server 12 will reference the command table 51 for the course 33 to determine which of the permission sets 31 (if any) need to be activated prior to executing the received command.

In some embodiments, the required permission sets associated with one or more commands 50 to be executed may be provided to the client computer 14 as at least part of one or more web pages. In such cases, the web page may have sufficient information to request that the user activate additional permission sets without needing to reference the command table 51 on the server 12.

However, in some embodiments, the command-specific requirements may not require any permission sets to be activated for the associated command to be executed. That is, the command-specific requirements may have a null-set of permission sets 31 (e.g. zero permission sets). For example, a permission set need not be activated to view a list of topics being taught in that course such that anyone (e.g. those with guest account identifiers) can view that information.

For example, a first command C1 (generally indicated by reference numeral 52) to read a single record may be executed if at least one of the permission sets P1, P2, P3, P7, P8 and P9 is activated. However, a second command C2 (generally indicated by reference numeral 54) to read multiple records may require at least one of the permission sets P2, P3, P7 and P8, and both permission sets P4 and P5 to be activated prior to execution. In particular, reading multiple records may have an increased level of risk associated therewith (e.g. due to privacy concerns) in comparison to just reading a single record; therefore, the command specific security requirements reflect this additional risk by requiring operational context-based permission sets P4 and P5 to be activated.

In another example, a third command C3 to add a single record (generally indicated by reference numeral 56), requires at least one of the permission sets P2, P3, and P8 to be activated prior to execution. As the command is associated with adding a record, there is less risk associated therewith and it may not be necessary to require the operational context-based permission sets P4, P5, and/or P6 to be activated. However, in another example, a fourth command C4 to add a multiple records (generally indicated by reference numeral 58) may be considered to be more risky in comparison, and thus may require operational context-based permission set P6 (in addition to at least one of P2, P3, or P8) to be activated prior to execution of the command C4.

In another example, a fifth command C5 to modify a single record (generally indicated by reference numeral 60) may require at least one of the permission sets P2, P3, and P8, in addition to both permission sets P4 and P5 to be activated prior to execution. However, a sixth command C6 to modify multiple records (indicated generally as 62) may be configured to be executed only if the role-based permission set P3 associated with the administrator role is activated OR the task-based permission set P8 associated with setting up a class is activated, in addition to the operational context-based permission sets P4, P5, and P6 also being activated.

In yet another example, commands C7 and C8, indicated by reference numerals 64 and 66 are associated with deleting single and multiple records, respectively. Since the command C8 associated with deleting multiple records may have a high degree of risk, it may be configured such that it can only be executed when permission set P3 associated with the administrator role is activated and all the operational context-based permission sets P4, P5 and P6 are activated. In contrast, the command C7 to delete a single record, may not be deemed as risky as command C8, so command C7 can be configured to be executable if either permission set P3 (associated with the administrator role) or P2 (associated with the instructor role) is activated in addition to the operational context P6 permission. With such a configuration, an administrator will be able to perform deletion of multiple records but an instructor will not. However, both the administrator and the instructor may delete a single record.

The command-specific requirements may vary based on one or more operational contexts associated with the received command(s). In some embodiments, the operational context may include a time component (e.g. when the command is received), a location component (e.g. where the command is received from, for example a particular geographic location or an IP address), a history component (e.g. with historical information about previous commands executed in association with that account identifier), and so on. In other embodiments, other operational-context may be assessed, for example, based on user input.

The operational context may add or remove permission sets 31 to or from the command-specific requirements 50. For instance, permission sets P4, P5, P6 may be required for the associated command to be executed in certain operational contexts.

For example, as shown command C8 to delete multiple records may require that the permission state P8 be activated before the command will be executed. However, command C8 may also require additional permission sets P4, P5, and/or P6 to be activated depending on one or more operational contexts.

In some embodiments, the operational context may include a location component associated with information about a location from which the command request is received, or where the command was sent from. For example, if a command that is submitted to be executed is received from a new or different location (e.g. an IP address that is new for that particular user) or a location that is deemed to be risky (e.g. a location in a foreign country), the command-specific requirement may determine that the permission set P6 must be activated.

In some embodiments, the location component may include or be associated with a network address (e.g. an Internet Protocol or IP address), a geographical location (e.g. a city, a country, etc.), or both a network address and a geographical location. For example, if a student usually accesses his records from a given country (e.g. the United States), and a command is being received from another country (e.g. China), additional security verification may be desirable to confirm that unauthorized access is not underway.

In another example, if the system admin access is usually performed from a given IP address, and an administrative command is now being received from a different IP address, additional security verification may be desirable.

In some embodiments, the operational context may include time information about when the command request is received. For example, if back-up operations are usually performed in early mornings on weekends (e.g. at 2:48 AM on Saturday mornings), commands associated with back-up operations received in the middle of the afternoon on a weekday may require that one or more additional permission sets be activated. For example, the permission set P5 may be required.

In some embodiments, the command-specific requirements may be determined based on the level of risk associated with certain commands. For example, the command C8 to delete multiple records may be deemed as having a high risk associated therewith and therefore may include all (or at least a substantial number) of the permission sets P4, P5, P6 that are based on operational context. In contrast, a command to grant access to read a single record, which may be considered to be low risk, may not require the permissions sets P4, P5, P6 based on operating environment to be activated.

The command-specific requirements may also be customizable or otherwise modifiable, for example based on user preference information. For instance, it may be possible to include or exclude certain specific permission sets based on user preference information, such as selections made by a user. However, in some embodiments, there may be a minimum level of permission sets that must be activated for the command to the executed (e.g. for example, a user may be able to "opt-in" to increase the number of permission sets that will be triggered in a given operation context, but may not be able to "opt-out" of certain permission sets).

Referring back to FIG. 2, as shown the account identifier 30 has a number of permission sets 32 that are available to the account identifier. That is, these permission sets 32 may be available to the account identifier to be activated after executing an associated security verification process. In some cases, the available permission sets 32 may differ from account identifier to account identifier.

The permissions that are available for each permission set 31 may be organized based on various paradigms. In the embodiment as shown, the permission sets 31 may include role-based permission sets P1, P2, P3, generally indicated by reference numerals 32, 34, and 36, respectively, which grant permissions to execute one or more commands in association with a role that a user might have when interacting with the server 12.

For instance, the permission set P1 is associated with a "student" role, and may include permissions useful for a student to access relevant portions of the data stored in the server 12 (or in an associated external database). Similarly, permission sets P2 and P3 are associated with an "instructor" role and an "administrator" role, respectively. Generally, using roles to grant specific permissions may reduce administrative burdens when setting up levels of access for various account identifiers.

It may also be possible for the account identifier 30 to have more than one role-based permission sets. As shown, the account identifier 30 has three role-based permission sets P1, P2 and P3. Having multiple role-based permission sets associated with multiple roles may allow the account identifier 30 to operate with a minimum (or at least reduced) required level of access. For example, if the commands that are being executed only require student-level access, then the permission set with instructor level access need not be activated.

This may help limit the potential harm that can be caused by unauthorized programs. For example, if the client computer 14 is compromised, unauthorized programs may not be able to cause as much harm to the server 12 when the student-level permission set P1 is activated, in comparison to when the administrator level permission set P3 is activated.

The permission sets 31 may be defined according to one or more functional or logical tasks. For example, a permission set that is adapted to permit back-ups of records may provide read-access to all the records. As shown, a task-based permission set P7, indicated by reference numeral 44, provides read-access to records stored in the server 12.

Additionally, a task-based permission set P8, indicated by reference numeral 46, provides permissions necessary to execute commands to set up a class list. For example, the access granted by this permission set P8 may include access required to perform batch edits of multiple records.

In some embodiments, the permission sets may be defined based on operational context. These operational context-based permission sets may facilitate execution of additional security verification processes in situations that are deemed to be risky for various reasons. For example, if a command that is submitted to be executed is not a command that is usually submitted in association with the account identifier 30, then the command-specific requirement may include that operational context-based permitted permission set P5 be activated.

In some embodiments, an available permission set may be customized based on user input (e.g. user preference information) provided by one or more users of the system 10. For example, security conscious users may desire that additional security verification to be performed when accessing certain personal information. Within an eLearning system, for example, a user may wish to be informed when commands to access its grade in association with its account identifier are being executed. This may warn the user (e.g., a student) in cases where a password associated with its account identifier has been compromised. In the example as shown, a custom permission set P9 is generally indicated by reference numeral 48.

It will be understood that the particular configurations for commands and permissions sets as described herein may be varied, for instance depending on factors such as a desired system configuration, particular regulatory requirements, technical requirements, and so on.

In the embodiments shown, the account identifier 30 may have various permission sets 31. In other embodiments, the available permission sets 31 that are associated with a given account identifier may be limited to permission sets that are legitimately required for the user associated with the account identifier. In other embodiments, the user identifier may have other available permission sets associated with one or more other eLearning courses. Additionally, the user may require different types or levels of access for different classes, which may be provided by another set of available permission sets for different classes.

In other embodiments, the permission sets 31 associated with a given account identifier may differ such that there may be a larger or smaller number of permission sets 31 associated with the given account.

In some embodiments, there may not be any permitted permission sets associated with a particular account identifier. For example, a "guest" account identifier may not have any available permission sets associated therewith.

In some embodiments, once one of the permission sets 31 is activated, it may remain activated for a defined period. The defined period may be determined based on elapsed time since it was activated, duration of a particular session, or any other suitable or desired factors.

As noted above, to activate one of the permission sets 31, the security verification process associated with that permission set must be executed.

In some cases, the security verification process may involve requesting and verifying the account identifier 30 and associated password from the client computer 14. For example, if the client computer 14 is requesting certain information but has not provided an account identifier (or requesting information as a guest), then it may be desirable to have the client computer 14 "log-in".

In some embodiments, the security verification process may be an active security verification process or a passive security verification process.

An active security verification process generally requires a user to provide some form of input prior to the command being executed (e.g. type in a password, etc.) In contrast, a passive security verification process may notify the user about the action being taken, but may not require input from the user.

Active security verification processes may include, for example, requiring the user to answer a challenge question, performing an additional log-in (e.g. using a second password or username, or both), performing biometric authentication, interacting with a personal electronic device associated with the account identifier (e.g. a smart phone or cellular telephone), and so on.

For example, in some embodiments, the server 12 may send a challenge or a "pin" to an electronic device, such as a phone 20 (e.g. by SMS through cellular site 22) and/or to an email address 18 associated with the account identifier 30, and require that the user to respond to that challenge or provide the pin prior to the command being executed. This may provide an additional layer of security against situations where the account and/or the client computer 14 may be compromised.

In some embodiments, an active security verification process may require that the user confirm that execution of a particular command was requested. In such, cases, a prompt may be sent to the client computer 14 for confirmation. This may provide an additional layer of security against situations where an authorized application is attempting to execute a command in the background without the user's knowledge.

In some embodiments, a passive security verification process comprises sending the user a notification. In some cases, the notification may be sent to the client computer 14, phone 20 or the email address 18 or any combination thereof.

In some embodiments, a passive security verification process may be executed before, in parallel to, or subsequent to, the permission set being activated (and the associated command is executed) as the passive security process generally serves primarily as a notification function and the timing of when it is executed may not be as crucial. In contrast, active security verification processes may typically be executed before the permitted security state is activated, and thus may provide for more robust security.

In some embodiments, active and passive security verification processes may be customizable. That is, the security verification processes may be set for particular commands based on user preference information and security requirements so as to strike a balance between convenience and security.

Figure 4:
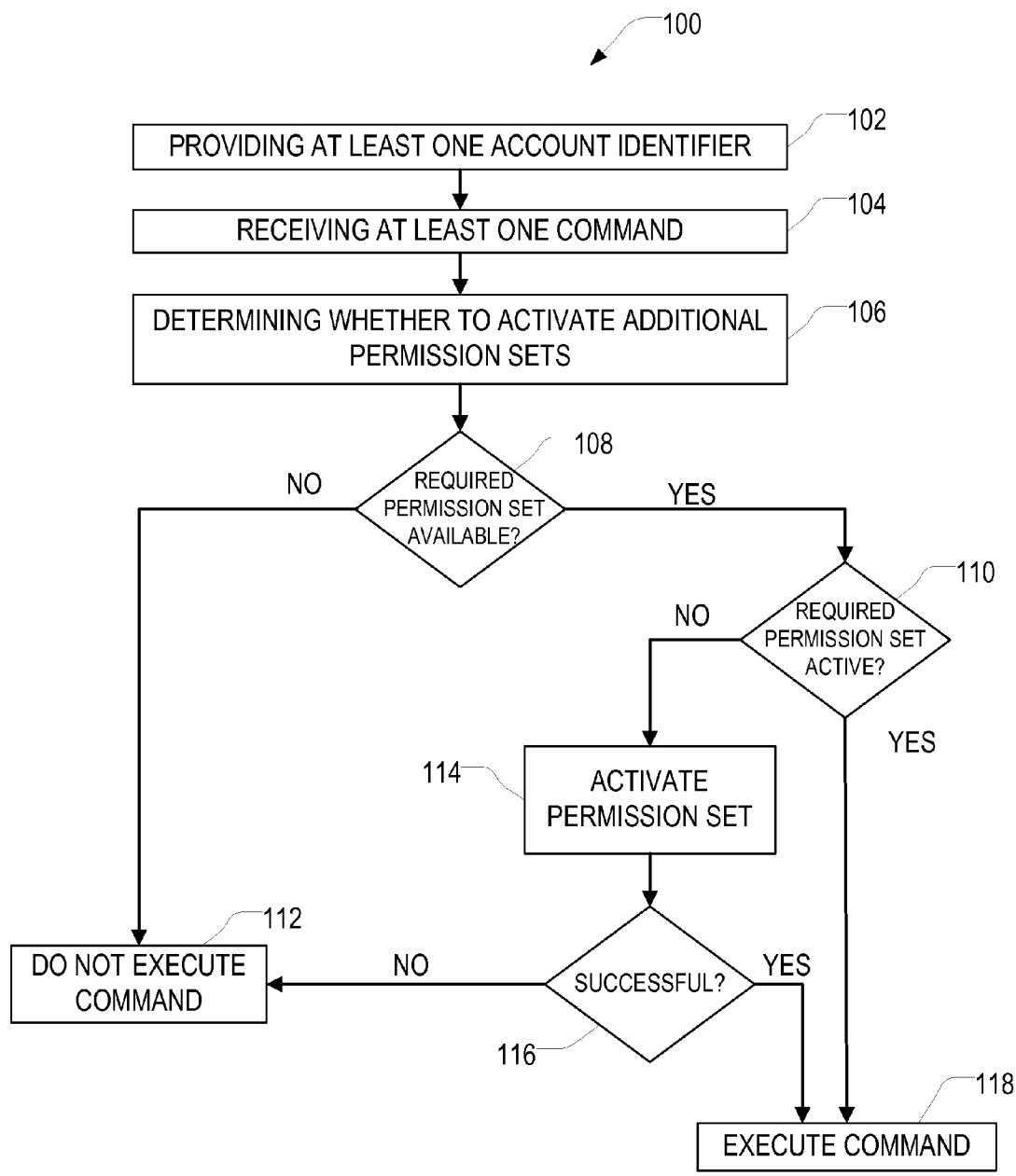
FIG. 4 is a security verification method according to other embodiments.

Referring now to FIG. 4, illustrated therein is a security verification method 100 according to one embodiment. The security verification method may be executed by one or more processors of a server, for example, the sever 12 of the system 10 described herein above.

At step 102, an account identifier is received. The account identifier may include security information indicative of zero or more available permission sets associated therewith. In some embodiments, each of the available permission sets may have an associated security verification process necessary to activate that permission set, and which may be customizable. In some embodiments the account identifier may not have any available permission sets associated therewith (e.g. a guest account identifier) or the account identifier may have one or more available permission sets associated therewith.

Generally, the account identifier may be received from a client computer (e.g. the client computer 14). The security information associated with the account identifier may be stored on the server, or at a location accessible to the server.

In some embodiments, the available permission sets may be the available permission sets 31 described above. In other embodiments, the permission sets may be different from the permission sets 31. In some embodiments the permission sets may be generated based on various paradigms as described above. In some embodiments, the permission sets may also include permission sets that are customized based on user preference information.

In some embodiments, each permission set may have a security verification process, and which may be customizable. The security verification process may be an active security verification process or a passive security verification process. In some embodiments, the active security verification process and the passive security verification process may include one or more of the security verification processes as described above.

At step 104, at least one command associated with the account identifier is received for execution. In some embodiments, steps 102 and 104 may be performed simultaneously. For example, a web-request received from a client computer may include both the account identifier and the command to be executed.

The received command has one or more command-specific requirements associated therewith. Each of the commands has command-specific requirements comprising zero or more of the permission sets that need to be activated before that command is executed. That is, some command specific requirements may not have any permissions sets that need to be activated, or may have one or more permission sets that need to be activated to execute that command. In some embodiments, the command-requirements may be the command specific requirements described above.

At steps 106, it is determined whether it is necessary to activate one or more permission sets associated with the command in order to execute the command. In particular, in some embodiments, the step 106 may include steps 108 and 110.

At step 108, it is determined whether the permission sets required to execute the command are available to the account identifier for activation. If the required permission sets are not available, the method 100 proceeds to step 112 and does not execute the command. Alternatively, if the required permission sets are available, the method 100 proceeds to step 110.

At step 110, it is determined whether the required permission sets have been activated. If the required permission sets have been activated, the method 100 proceeds to step 118, where the received command is executed. Alternatively, if the required permission sets have not been activated, the method 100 proceeds to step 114.

At step 114, one or more required permission sets are activated by executing one or more security verification processes associated with the required permission sets.

At step 116, it is determined whether the executions of the security verification processes from step 114 are successful. If it is determined that the security verification processes have been successfully executed, the method 100 process to step 118, wherein the associated permission sets are activated and the received command is executed. Alternatively, if one or more of the security verification process are not successfully executed, the method proceeds to step 112 and the received command is not executed.

The systems and methods described herein generally relate to security verification systems and methods. As shown in the figures, embodiments have been described with reference to a web-based eLearning system as an illustrative example. However, the systems and methods according to various embodiments may be utilized in systems other than eLearning systems. In particular, while the above description provides examples of one or more apparatus, methods, or systems, it will be appreciated that other apparatus, methods, or systems may be within the scope of the present description as interpreted by one of skill in the art.

The invention claimed is:

1. A security verification system for an electronic learning environment, the system comprising:
   at least one client computer having a client processor, the client processor adapted to send at least one command for execution; and
   at least one server having a server processor in data communication with the at least one client computer, the server processor being adapted to:
   provide an account for allowing access to the electronic learning environment, the account being associated with a plurality of permission sets, wherein at least a subset of permission sets are associated with corresponding ones of a plurality of roles in relation to the electronic learning environment, the plurality of permission sets including:
   (i) a first permission set available for activation, the first permission set comprising permissions to execute a first plurality of commands associated with a first user role for a first electronic learning course available on the electronic learning environment, the first plurality of commands being executable when the first permission set is activated, and the first permission set having a first security verification process associated therewith to activate the first permission set; and
   (ii) a second permission set available for activation, the second permission set being different from the first permission set, the second permission set comprising permissions to execute a second plurality of commands associated with a second user role for a second electronic learning course available on the electronic learning environment, the second plurality of commands being executable when the second permission set is activated, and the second permission set having a second security verification process associated therewith to activate the second permission set;
   wherein once one of the first or the second permission sets is activated, the activated permission set remains activated for a defined period and the server processor is further adapted to deactivate the activated permission set upon expiry of the defined period.

2. The security system of claim 1 further comprising a portable electronic device in data communication with the server, and wherein the first security verification process comprises sending information to that portable electronic device.

3. The security system of claim 2, wherein the first security verification process comprises receiving a response to the information sent to the portable electronic device.

4. A security verification server comprising a server processor and a memory storing instructions which, when executed by the server processor, cause the server processor to:
   provide an account for allowing access to an electronic learning environment, the account being associated with plurality of permission sets, wherein at least a subset of permission sets are associated with corresponding ones of a plurality of roles in relation to the electronic learning environment, the plurality of permission sets including:
   (i) a first permission set available for activation, the first permission set comprising permissions to execute a first plurality of commands associated with a first user role for a first electronic learning course available on the electronic learning environment, the first plurality of commands being executable when the first permission set is activated, and the first permission set having a first security verification process associated therewith to activate the first permission set; and
   (ii) a second permission set available for activation, the second permission set being different from the first permission set, the second permission set comprising permissions to execute a second plurality of commands associated with a second user role for a second electronic learning course available on the electronic learning environment, the second plurality of commands being executable when the second permission set is activated, and the second permission set having a second security verification process associated therewith to activate the second permission set;
   wherein once one of the first or the second permission sets is activated, the activated permission set remains activated for a defined period and the server processor is further adapted to deactivate the activated permission set upon expiry of the defined period.

5. The server of claim 4, wherein the server processor is further adapted to:
   receive first input, via the first security verification process, to activate the first permission set; and
   receive second input, via the second security verification process, to activate the second permission set.

6. The server of claim 5, wherein the server processor is further adapted to:
   receive a command for execution from a client computer, the command having a command-specific requirement that a given permission set is required to be activated before the command is executed;
   determine whether the activated first permission set or the activated second permission set constitutes the given permission set that is required to be activated before the command is executed; and
   if it is determined that the activated first permission set or the activated second permission set constitutes the given permission set that is required to be activated before the command is executed, allow the command to be executed, otherwise, do not allow the command to be executed.

7. The server of claim 6, wherein the server processor is further adapted to determine an operational context associated with the received command, and modify a command-specific requirement of the received command based on the operational context.

8. The server of claim 7, wherein the operational context includes location information indicative of the location of where the command is received from.

9. The server of claim 7, wherein the operational context includes time information indicative of when the command was received.

10. The server of claim 4, wherein the account is associated with a third permission set, the third permission set comprising permissions to execute a third plurality of commands in a given operational context.

11. The server of claim 4, wherein the account is associated with a fourth permission set, the fourth permission set comprising permissions to execute a fourth plurality of commands that are associated with a functional task.

12. The server of claim 4, wherein the first security verification process comprises at least one of a passive security verification process and an active security verification process.

13. The server of claim 12, wherein when the first security verification process includes a passive security verification process, the server is further adapted to send at least one notice to a contact associated with the account.

14. The server of claim 12, wherein when the first security verification process includes an active security verification process, the server is further adapted to receive input from a client computer, and based on the received input, determine whether to activate the permission set.

15. A security verification method for an electronic learning environment, the method to be performed by a server comprising a server processor, the method comprising:
the server providing an account for allowing access to an electronic learning environment, the account being associated with plurality of permission sets, wherein at least a subset of permission sets are associated with corresponding ones of a plurality of roles in relation to the electronic learning environment, the plurality of permission sets including:
(i) a first permission set available for activation, the first permission set comprising permissions to execute a first plurality of commands associated with a first user role for a first electronic learning course available on the electronic learning environment, the first plurality of commands being executable when the first permission set is activated, and the first permission set having a first security verification process associated therewith to activate the first permission set; and
(ii) a second permission set available for activation, the second permission set being different from the first permission set, the second permission set comprising permissions to execute a second plurality of commands associated with a second user role for a second electronic learning course available on the electronic learning environment, the second plurality of commands being executable when the second permission set is activated, and the second permission set having a second security verification process associated therewith to activate the second permission set;
wherein when one of the first or second permission sets is activated, the activated permission set remains activated for a defined period and the activated permission set is deactivated upon expiry of the defined period.

16. The method of claim 15, further comprising:
receiving first input, via the first security verification process, to activate the first permission set; and
receiving second input, via the second security verification process, to activate the second permission set.

17. The method of claim 16, further comprising:
receiving a command for execution from a client computer, the command having a command-specific requirement that a given permission set is required to be activated before the command is executed;
determining whether the activated first permission set or the activated second permission set constitutes the given permission set that is required to be activated before the command is executed; and
if it is determined that the activated first permission set or the activated second permission set constitutes the given permission set that is required to be activated before the command is executed, allowing the command to be executed, otherwise, do not allow the command to be executed.

18. The method of claim 17, further comprising determining an operational context associated with the received command, and modifying a command-specific requirement of the received command based on the operational context.

19. The method of claim 18, wherein the operational context includes location information indicative of the location of where the command is received from.

20. The method of claim 18, wherein the operational context includes time information indicative of when the command was received.

21. The method of claim 15, wherein the account is associated with a third permission set, the third permission set comprising permissions to execute a third plurality of commands in a given operational context.

22. The method of claim 15, wherein the account is associated with a fourth permission set, the fourth permission set comprising permissions to execute a fourth plurality of commands that are associated with a functional task.

23. The method of claim 15, wherein the first security verification process comprises at least one of a passive security verification process and an active security verification process.

24. The method according to claim 23, wherein the passive security verification process comprises sending at least one notice to a contact associated with the account.

25. The method according to claim 23, wherein the active security verification process comprises requesting and receiving additional input prior to activating the permission set associated therewith.

26. A computer readable medium comprising instructions which, when executed by a processor of a server, causes the processor to perform a method of security verification, the method comprising:
providing an account for allowing access to the electronic learning environment, the account being associated with plurality of permission sets, wherein at least a subset of permission sets are associated with corresponding ones of a plurality of roles in relation to the electronic learning environment, the plurality of permission sets including:
(i) a first permission set available for activation, the first permission set comprising permissions to execute a first plurality of commands associated with a first user role for a first electronic learning course available on the electronic learning environment, the first plurality of commands being executable when the first permission set is activated, and the first permission set having a first security verification process associated therewith to activate the first permission set; and
(ii) a second permission set available for activation, the second permission set being different from the first permission set, the second permission set comprising permissions to execute a second plurality of commands associated with a second user role for a second electronic learning course available on the electronic learning environment, the second plurality of commands being executable when the second permission set is activated, and the second permission set having a second security verification process associated therewith to activate the second permission set;
wherein when one of the first or second permission sets is activated, the activated permission set remains activated for a defined period and the activated permission set is deactivated upon expiry of the defined period.

27. The server of claim 4, wherein the first user role for the first electronic learning course comprises a student role, and the second user role for the second electronic learning course comprises an instructor role.

28. The method of claim 15, wherein the first user role for the first electronic learning course comprises a student role, and the second user role for the second electronic learning course comprises an instructor role.

* * * * *